(12) United States Patent
Cooper

(10) Patent No.: US 7,474,337 B1
(45) Date of Patent: Jan. 6, 2009

(54) METHOD AND APPARATUS TO PROVIDE EDGE ENHANCEMENTS AS PART OF A DEMOSAICING PROCESS

(75) Inventor: Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 509 days.

(21) Appl. No.: 09/696,436

(22) Filed: Oct. 24, 2000

(51) Int. Cl.
*H04N 5/228* (2006.01)
(52) U.S. Cl. ............... 348/222.1; 348/273; 348/252
(58) Field of Classification Search ............... 348/273, 348/272, 280, 231.9, 625, 222.1, 254, 252; 382/167, 162, 266, 268, 269, 284; 358/517
See application file for complete search history.

(56) References Cited

U.S. PATENT DOCUMENTS

| | | | | |
|---|---|---|---|---|
| 3,971,065 | A | 7/1976 | Bayer | 358/41 |
| 5,142,592 | A * | 8/1992 | Moler | 382/200 |
| 5,528,698 | A * | 6/1996 | Kamei et al. | 382/100 |
| 5,666,443 | A * | 9/1997 | Kumashiro | 382/266 |
| 5,717,781 | A * | 2/1998 | Ebel et al. | 382/141 |
| 6,108,453 | A * | 8/2000 | Acharya | 382/254 |
| 6,229,578 | B1 * | 5/2001 | Acharya et al. | 348/607 |
| 6,269,181 | B1 * | 7/2001 | Acharya | 382/162 |
| 6,272,261 | B1 * | 8/2001 | Matsuoka | 382/276 |
| 6,288,743 | B1 * | 9/2001 | Lathrop | 348/231.9 |
| 6,292,535 | B1 * | 9/2001 | Williams et al. | 378/98.8 |
| 6,304,294 | B1 * | 10/2001 | Tao et al. | 348/370 |
| 6,307,569 | B1 * | 10/2001 | Ratakonda | 345/671 |
| 6,366,318 | B1 * | 4/2002 | Smith et al. | 348/272 |
| 6,404,918 | B1 * | 6/2002 | Hel-or et al. | 382/167 |
| 6,542,187 | B1 * | 4/2003 | Hamilton et al. | 348/234 |
| 6,650,795 | B1 * | 11/2003 | Motta | 382/312 |
| 6,914,628 | B1 * | 7/2005 | Kuwata et al. | 348/272 |
| 2004/0258327 | A1 * | 12/2004 | Cheatle et al. | 382/284 |

OTHER PUBLICATIONS

Kimmel, Transactions On Image Procession, Sep. 1999, IEEE, vol. 8, No. 9, p. 1221-1228.*

K. Jensen and D. Anastassiou, "Subpixel Edge Localization and the Interpolation of Still Images", IEEE Transactions on Image Processing, vol. 4(3), pp. 285-295, 1995.

B. Morse and D. Schwartzwald, "Isophote-Based Interpolations", International Conference on Image Processing—1998, ICIP 98 vol. 3, pp. 227-231, 1998.

D. Brainard and D. Sherman, "Reconstructing Images from Trichromatic Samples: From Basic Research to Practical Applications", Proceedings of the IS&T/SID Color Imaging Conference: Color Science, Systems, and Applications, pp. 4-10, 1995.

(Continued)

*Primary Examiner*—Tuan V Ho
(74) *Attorney, Agent, or Firm*—Blakely, Sokoloff, Taylor & Zafman LLP

(57) ABSTRACT

A method and apparatus provide edge enhancements as part of a demosaicing process in which an image is captured. By providing edge enhancements as part of the demosaicing process, the edge enhancement process has access to unaltered spatial and chromatic information contained in the raw captured image data.

29 Claims, 10 Drawing Sheets
(2 of 10 Drawing Sheet(s) Filed in Color)

OTHER PUBLICATIONS

J. Adams, Jr., "Interactions between Color Plane Interpolation and Other Image Processing Functions in Electronic Photography", Electronic Imaging, Proc. of SPIE, vol. 2416, pp. 144-151, 1995.

J. Adams, K. Parulski, and K. Spaulding, "Color Processing in Digital Cameras", IEEE Micro, 18(6) pp. 20-31, 1998.

T. Kuno, H. Sugiura, and N. Matoba, New Interpolation Method Using Discriminated Color Correlation for Digital Still Cameras, Journal of the IEEE, 3063, pp. 259-267, 1999.

T. Acharya and P. Tsai, "A New Block Matching Based Color Interpolation Algorithm", IS&T/SPIE Conference on Color Imaging: Device-Independent Color, Color Hardcopy and Graphic Arts IV, SPIE vol. 3648, pp. 60-65, 1999.

B. Tao, I. Tastl, T. Cooper, M. Blasgen, and E. Edwards, "Demosaicing using Human Visual Properties and Wavelet Interpolation Filtering", Seventh Color Imaging Conference: Color Science, Systems, and Applications, IS&T/SID Color Conference, pp. 252-256, 1999.

S. Ohno, "The Present Condition and the Future of Digital Still Cameras", O plus E, 214, pp. 91-95, 1997.

* cited by examiner normal demosaic results of a high contrast line with FRINGE EFFECT FRINGE EFFECT removed showing achromatic edges Create MASK image from Fringe-corrected image

FIG 6A or 6B multiplicative blend

Final Edge Enhanced image from Demosaic + Edge Enhancement Process

METHOD AND APPARATUS TO PROVIDE EDGE ENHANCEMENTS AS PART OF A DEMOSAICING PROCESS

FIELD OF THE INVENTION

The present invention relates generally to image processing and image processing devices. More particularly, the present invention relates to a method and apparatus to provide edge enhancements as part of a demosaicing process.

BACKGROUND OF THE INVENTION

A common image processing device is a digital still camera (DSC). A DSC is an image input device that typically includes a single charge-couple device (CCD) array. A CCD array is an array of light detectors, which typically detects one of three monochrome colors (e.g., red R, green G, or blue B) for each light detector location. To output a color image, however, the DSC must provide a complete set of RGB (or CMY or $YC_rC_r$) tri-stimulus values for each light detector location. Such a process is commonly referred to as "demosaicing" in which full color at every pixel is calculated from a patchwork of color filter values distributed over the captured image.

Thus, a typical image processing workflow for a current DSC is to capture an image using the CCD array of light detectors, to convert the information from the light detectors into digital form (i.e., raw captured image data), and to provide color to image data by a demosaicing process, to perform a white balancing process, to perform a chromatic improvement process, and finally to perform an edge enhancement process.

In the image capturing process, prior to demosaicing, a DSC arranges the colors from the light detectors in a systematically repeating pattern as the raw captured image data. For example, the raw captured image data can have "Bayer" pattern with interleaved lines of "RGRGRG . . . " followed by lines of "GBGBGB . . . " At this point, the captured image is represented as a mosaic of RGB color primaries for each light detector location in which no color can be viewed.

Demosaicing is thus the process of computing a complete set of tri-stimulus values at every CCD light detector location to provide color to the image. A number of algorithms can be used to compute the complete set of values, which typically involve nearest neighbor substitution, bi-linear interpolation, and median filtering. For example, a pixel or light detector location, which corresponds to a green detector can infer from neighboring detectors what red and blue values should be at that location where the green detector is located. Similarly, a pixel that corresponds to a red detector can infer from neighboring detectors what the green and blue values are at that location.

A limitation with the demosaicing process, which is equivalent to low-pass filtering process, is that it has some inherent side effects. For example, a low-pass filtering process attenuates the high-frequency detail or accentuates the low-frequency detail of an image. Thus, a common side effect is that it introduces chromatic fringing at the edges of sharp contrast boundaries in an image. That is, the edges of the sharp contrast boundaries have red and blue fringe artifacts. FIG. 1 shows an image 100 having such red and blue artifacts referenced by numerals 101 and 103, respectively.

Currently, the DSC industry uses various forms of edge enhancement processes to improve an image. An edge enhancement process is used to detect edges in an image and to increase the edge detail of the image to produce a more realistic and sharper image in keeping with certain aspects of the Human Visual System (HVS). Such a process, however, compounds the problem of the red and blue fringe artifacts because the edge enhancement typically causes the magnitude of the color fringing to increase in direct proportion to the intensity of the enhancement.

Furthermore, a disadvantage with the operation of a current DSC is that edge enhancements occur at the end of the image processing workflow, i.e., after white balancing and chromatic enhancement processes. White balancing is a process used to calibrate the proportion of red, green, and blue color values so that the white color in the image results in a pure white color without color casts. Chromatic enhancement is a process used to provide a deeper or more saturated color to the color image. Both of these processes, however, alter the raw captured image data before the edge enhancements can take place.

Consequently, a great deal of spatial and chromatic information originally present in the raw image data may have been before the edge enhancement process could have access to the data. This may cause low color fidelity and degraded edge sharpness. For example, as illustrated in FIG. 1, an exemplary image 100 is shown in which edge enhancements are performed late in an image processing workflow in accordance with prior art.

Referring to FIG. 1, image 100 shows a number "2," which is greatly magnified for purposes of illustration. Blue and red pixel alternations can be noticed by reference to numerals 101 and 103 in image 100 along the number "2." Such alternations are commonly referred to as a "chromatic moiré." The chromatic moiré is greatly exaggerated because edge enhancements occur late in the image data processing workflow thus causing the image to have low color fidelity and degraded edge sharpness.

SUMMARY OF THE INVENTION

According to one aspect of the invention, an image processing method is disclosed in which an image is captured and edge enhancements are provided to the captured image as part of a demosaicing process.

Other features and advantages of the present invention will be apparent from the accompanying drawings, and from the detailed description, which follows below.

BRIEF DESCRIPTION OF THE DRAWINGS

The patent or application file contains at least one drawing executed in color. Copies of this patent or patent publication with color drawing(s) will be provided by the U.S. Patent and Trademark Office upon request and payment of the necessary fee.

The features and advantages of the present invention are illustrated by way of example and not intended to be limited by the figures of the accompanying drawings, in which like references indicate similar elements and in which.

DETAILED DESCRIPTION

According to the embodiments described herein, a method and apparatus are described in which an image is captured and edge enhancements are provided to the captured image as part of a demosaicing process. By providing edge enhancements as part of the demosaicing process, significant improvements in color fidelity and edge sharpness are possible because the edge enhancement process has access to unaltered spatial and chromatic information contained in the raw captured image data.

Figure 2:
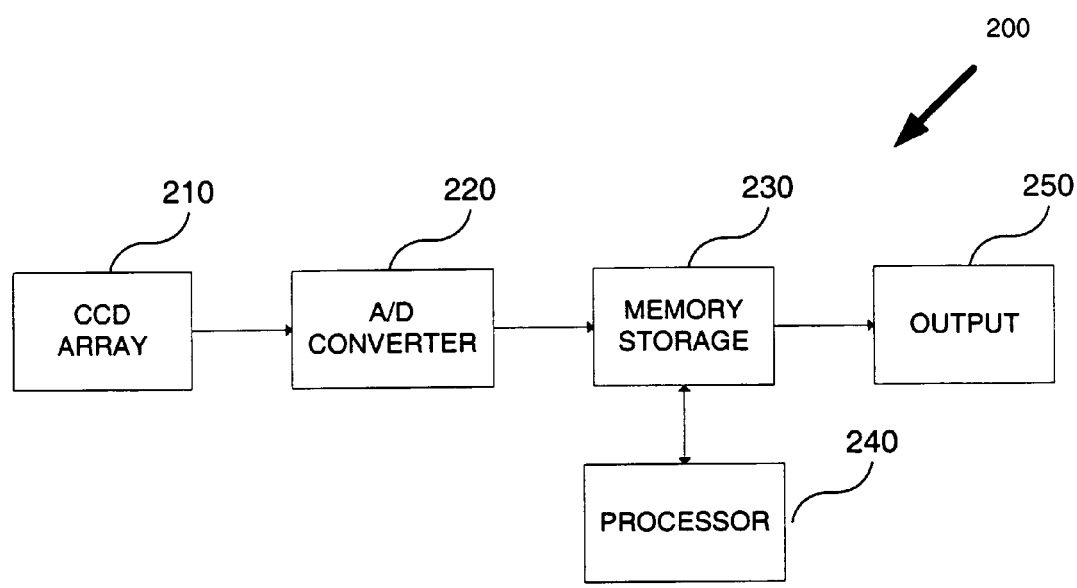
FIG. 2 depicts an exemplary image processing system in which the present invention can be implemented.

FIG. 2 depicts an exemplary image processing system 200 in which the present invention can be implemented. The image processing system 200 can represent any number of image processing devices such as, for example, an electronic camera, video camera, or a digital still camera (DSC), and is not intended to be limited to any particular image processing device.

Referring to FIG. 2, image processing system 200 includes a charge-couple device (CCD) array 210, an analog/digital (A/D) converter 220, memory storage 230, processor 240, and output 250. The CCD array 210 is coupled to the A/D converter 220. The A/D converter 220 is coupled to the memory storage 230. The processor 240 and output 250 are coupled to the memory storage 230.

CCD array 210 is an image detector having an array of light detectors. The CCD array 210 is only one type of image detector that may be used, however, other alternative image detectors can be used. For example, phototransistors, photodiodes, or any other form of photo capture device can be use as an image detector. CCD array 210 acquires raw image data using the array of light detectors. For one embodiment, CCD array 210 detects red R, green G, and blue B color primaries and arranges the color primaries in a repeating pattern such as, for example, a "Bayer" pattern, as "raw captured image data." For an alternative embodiment, CCD array 210 detects cyan-magenta-yellow-green (CMYG) color primaries and arranges the color primaries in a repeating pattern as the raw captured image data.

A/D converter 220 is a processing device that converts analog signals into digital signals. A/D converter 220 receives image information from the CCD array 210 as analog signals and converts them into digital signals. The digital signals representing the captured image are stored in memory storage 230 as the raw image data.

Memory storage 230 is a memory device to store data or information. Memory storage 230 can be a random access memory (RAM), flash memory, or other like memory devices. For alternative embodiments, memory storage 230 can include a plurality of memory devices. Memory storage 230 stores image data or information from the CCD array 210 and A/D converter 220. Alternatively, memory storage 230 can also store instructions to be processed by processor 240 to perform image processing operations on image data. Furthermore, memory storage 230 can provide short-term and long-term storage of image data for processing, display, and archival purposes.

Processor 240 is a processing device such as a high-speed microprocessor. Processor 240 can access memory storage 230 and process image data stored therein. For one embodiment, processor 240 processes raw image data stored in memory storage 230 and provides edge enhancements to the raw image data as part of a demosaicing process as will be described in further detail below. Processor 240 can also store the edge enhanced image back in memory storage 230. Furthermore, processor 240 can cause the edge enhanced image to be sent to output 250 or to be further processed.

Output 250 can be a display device such as, for example, a liquid crystal display (LCD) or other like display device. Alternatively, output 250 can be another storage device or a data compression device. Furthermore, output 250 can be an interface to an external or remote device in which image data is displayed or provided to the external or remote device. Output 250 can also output information or data to the external or remote device by a direct connection or a network connection.

The image processing techniques described herein can be implemented by hardware and/or software contained within image processing system 200. For example, image processor 240 can execute code or instructions stored in a machine-readable medium, e.g., memory storage 230, to perform the operations as described in FIGS. 3, 4, 5, and 7.

The machine-readable medium may include a mechanism that provides (i.e., stores and/or transmits) information in a form readable by a machine such a processor, computer, or a digital processing device. For example, a machine-readable medium may include a read only memory (ROM), random access memory (RAM), magnetic disk storage media, optical storage media, or flash memory devices.

Figure 3:
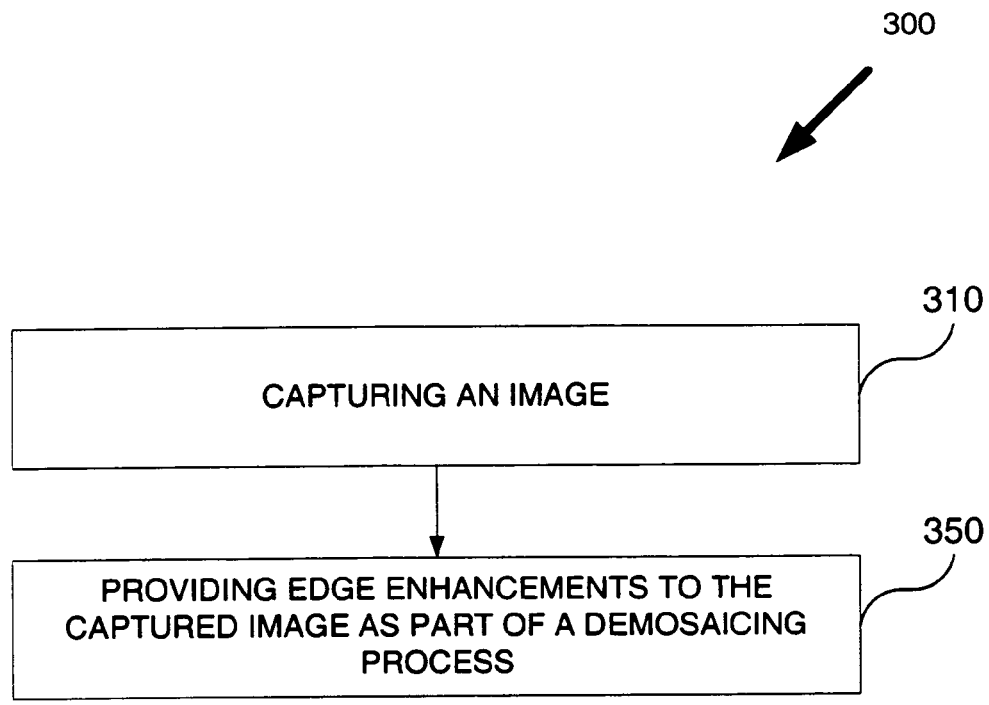
FIG. 3 depicts a flow chart illustrating an image processing operation according to one embodiment.

FIG. 3 depicts a flow chart illustrating an image processing operation 300 according to one embodiment. The operation 300 illustrates combining "demosaicing" and edge enhancement in the same process.

For purposes of explanation, operation 300 begins at operation 310. Referring to FIG. 3, at operation 310, an image is captured. For example, the CCD array 210 can capture an image using an array of light detectors. The captured image can be stored in memory storage 230 as raw image data in a Bayer pattern. Alternatively, the raw image data can be captured in other patterns.

At operation 350, edge enhancements are provided to the captured image as part of a demosaicing process. For example, processor 240 can process the raw image data stored in memory storage 230 to provide edge enhancements as part of a demosaicing process such as that explained with regards to FIG. 5. Alternatively, any form of edge enhancement process can be used for operation 300 such that it is performed as part of demosaicing.

By providing edge enhancements early in an image processing workflow, (i.e., as part of the demosaicing process), there can be significant improvements in color fidelity and edge sharpness because the edge enhancement process has access to unaltered spatial and chromatic information contained in the raw captured image data.

Figure 4:
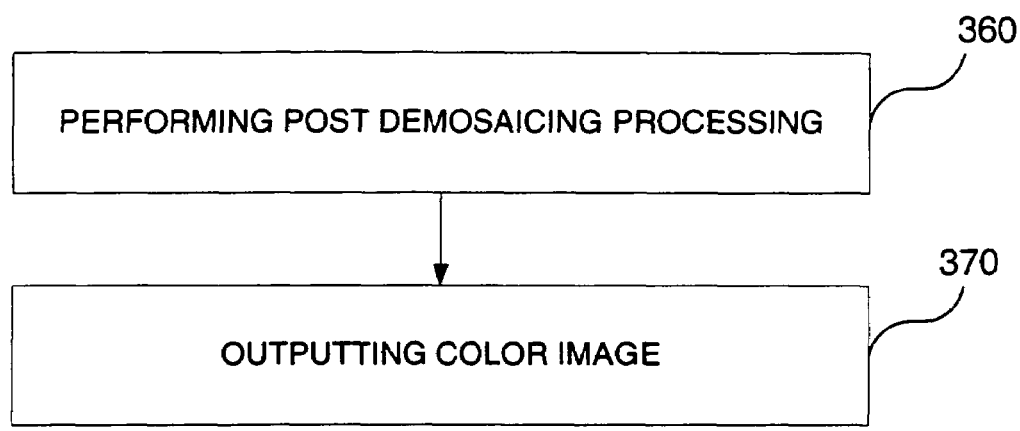
FIG. 4 depicts a flow chart illustrating post demosaicing processing according to one embodiment.

FIG. 4 depicts a flow chart illustrating post demosaicing processing according to one embodiment. The following operations shown in FIG. 4 can be performed after operation 350 of FIG. 3. Alternatively, the following operations can be optional.

Referring to FIG. 4, at operation 360, a post demosaicing process can be performed. For example, processes to further improve the image and color can be performed such as white balancing or chromatic improvement. Alternatively, the =demosaiced image can be compressed to be stored in memory storage 230.

At operation 370, the processed color image can be output to a user via a visual display. Alternatively, the color image can be output to a storage device for storage. The color image can also be output to external and remote devices either by a direct connection or a network connection.

Figure 5:
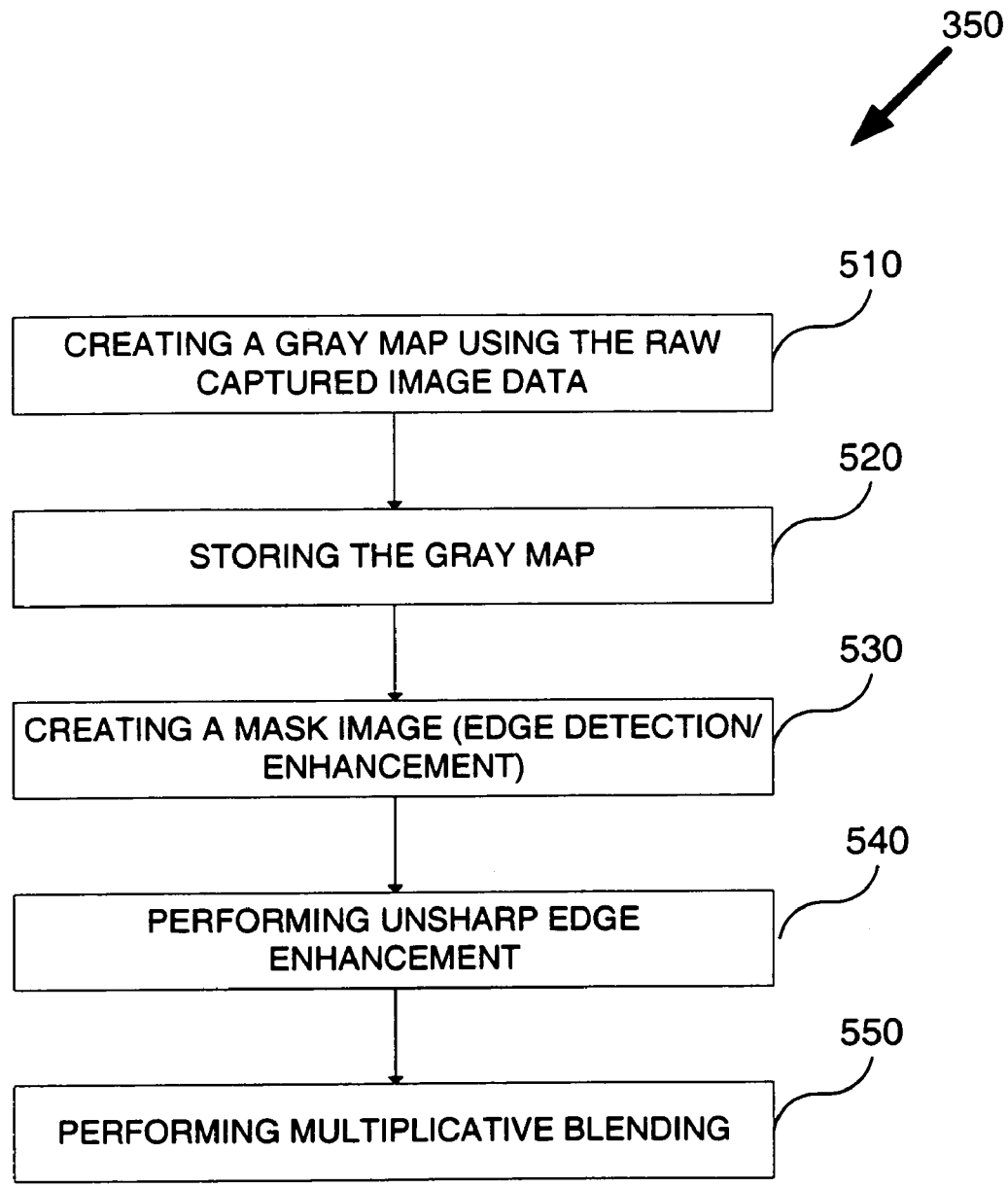
FIG. 5 depicts a flow chart illustrating a detailed operation for providing edge enhancements as part of the demosaicing process of FIG. 3 according to one embodiment.

FIG. 5 depicts a flow chart illustrating the detailed operation 350 for providing edge enhancements as part of the demosaicing process of FIG. 3 according to one embodiment. The operation 350 not only provides edge enhancement, but also demosaicing. Thus, operation 350 illustrates an operation that provides edge enhancements as part of a demosaicing process. For purposes of explanation, operation 350 begins at operation 510.

Figure 6A:
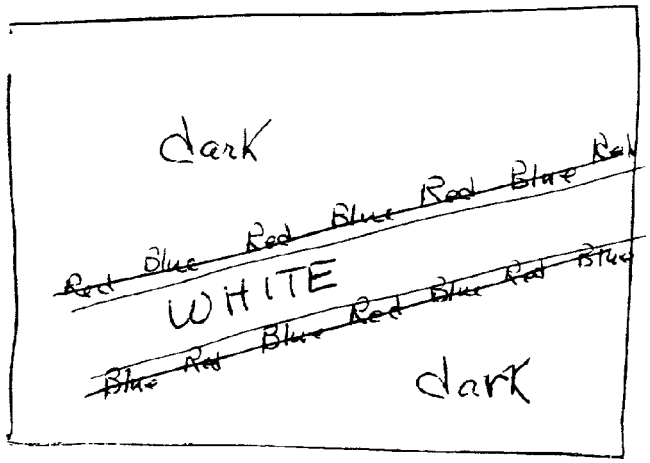
FIG. 6A depicts an exemplary schematic image based on raw data.
Figure 6B:
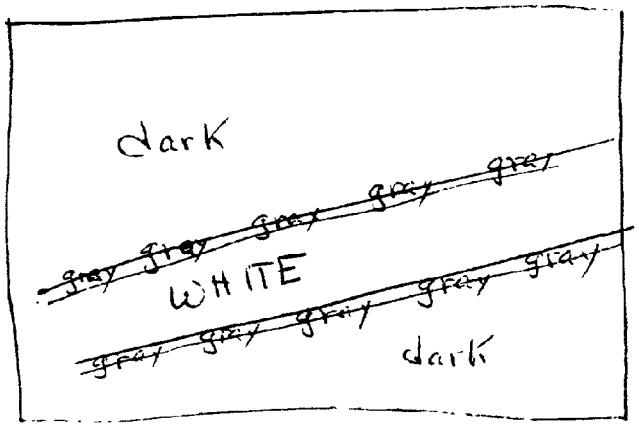
FIG. 6B depicts an exemplary schematic gray map image.

Referring to FIG. 5, at operation 510, a gray map (or brightness map) using the raw captured image data (e.g., RGB data) is created. FIG. 6A depicts an exemplary schematic image based on raw data. A demosaicing process may be employed to extract a first order approximation for the R, G, and B pixel values of the raw data to create a gray map (e.g., bi-linear interpolation). The gray map is an image composed of gray-level brightness. FIG. 6B depicts an exemplary schematic gray map image. It should be noted that attempts using a simplified luminance approximation for the gray map found in Equation (1) below failed noticeably if chromatic edges are present.

$$\text{Luminance} = 0.177*R + 0.813*G + 0.011*B [\text{failed}] \quad (1)$$

Instead, a luminance based on L*a*b* is much more robust. However, it is not required to use the full CIE L* calculation. The L*a*b* is one way to represent colors in color space, in which L* represents brightness, and a* and b* define chromatic axes. The luminance based on L*a*b* is used because it provides a perceptually uniform color space. The RGB data can easily be converted to L*a*b* values for some assume image white point.

At operation 520, the gray map image is stored. For example, the gray map image such as that shown in FIG. 6B can be stored in storage memory 230.

At operation 530, a mask image is created, which is formed by detecting edges in the gray map and providing enhancements to the edged. The edge detection/enhancement process is discussed in further detail in FIG. 7. For one embodiment, the pixels of the mask image are different from the original image located in strong brightness gradient areas. The final "color" of each changed pixel is either a maximum or minimum form the pixels that surround it. It should be noted that any form of edge enhancement can be used in this invention. Current methods include unsharp masking, zero-crossing gradient detection, chromatic discontinuity, and various kernel transforms. The use of the mask technique described here is just one embodiment of the edge enhancement process.

Figure 6C:
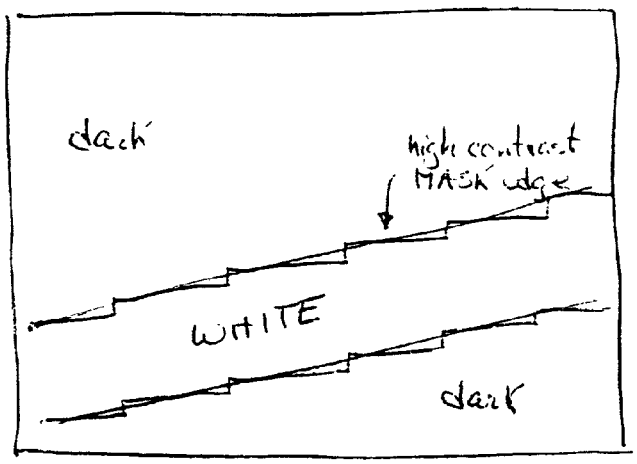
FIG. 6C depicts an exemplary high contrast masked edge for a mask image.

FIG. 6C depicts an exemplary high contrast masked edge for a mask image. For one embodiment, FIG. 6C may illustrate the mask image generated from FIG. 6B. Although no color is shown in FIG. 6C, the mask image can have fewer colors and more smoothly varying colors than the original image. Moreover, the visibility of the textual edges is more pronounced and lacks the chromatic moiré around the slanted edges of the text. This can have the affect of providing a block-like appearance.

Figure 6D:
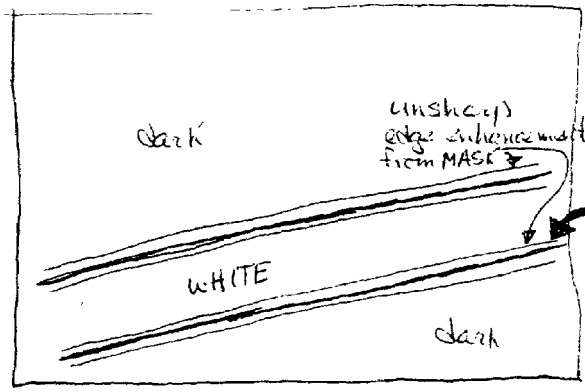
FIG. 6D depicts an exemplary image with unsharp edge enhancement.
Figure 6E:
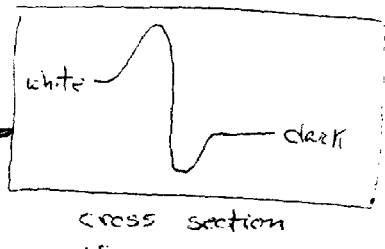
FIG. 6E depicts an exemplary luminance graph of a cross-sectional view of the image of FIG. 6D.
Figure 6D:
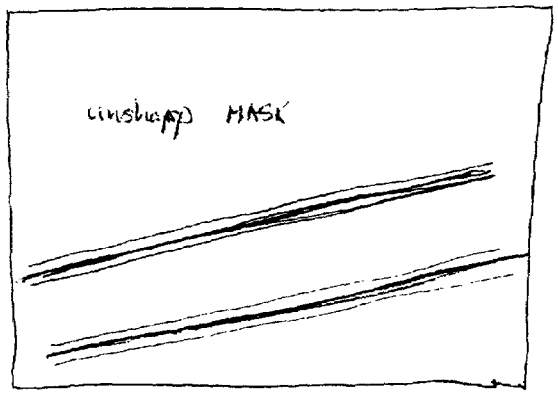

At operation 540, unsharp edge enhancement is performed on the mask image. That is, the block-like structured edges are smoothed by an unsharp edge enhancement process, which changes the luminance level to accentuate the edge transition contrast of an image. Also, because the mask image has strong visual steps in its contour, it typically needs to be smoothed by adding a fractional part of the original demosaiced image to it. FIG. 6D depicts an exemplary image with an unsharp edge enhancement, and FIG. 6E depicts an exemplary luminance graph of a cross-sectional view of the image of FIG. 6D.

At operation 550, multiplicative blending is performed to obtain the final output. For example, a blending process based on the formula (2) below can be performed to obtain the desired output.

$$\text{Output} = \text{Mask}*(1-a) + \text{Original}*a \quad (2)$$

Figure 6F:
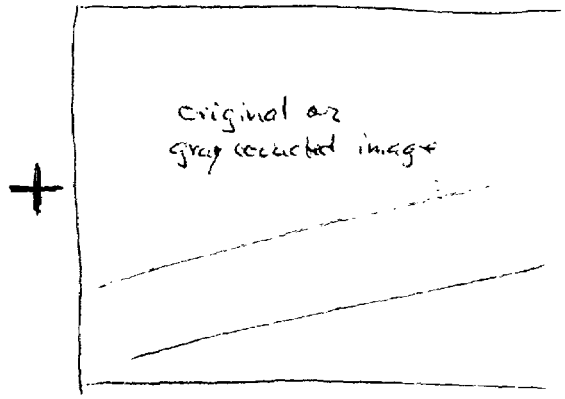
FIG. 6F depicts an exemplary schematic image with multiplicative blending.
Figure 6F:
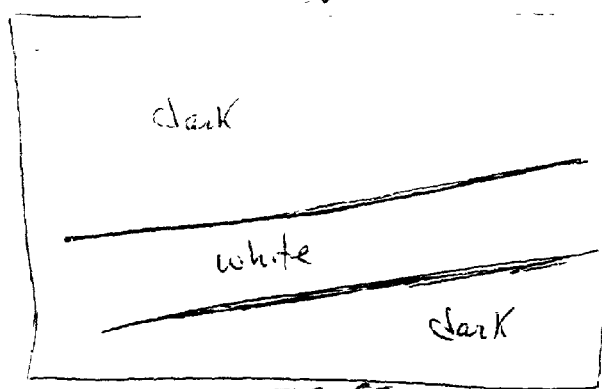

This blending process yields the original demosaiced RGB values everywhere except where strong gradients were found. FIG. 6F shows an exemplary image with the multiplicative bending. The optimal value of a depends on use for the image. For example, if soft smooth edges necessary, then larger values of a are preferred. Furthermore, for images with small text or fine jewelry, smaller values of a are preferred.

Figure 1:
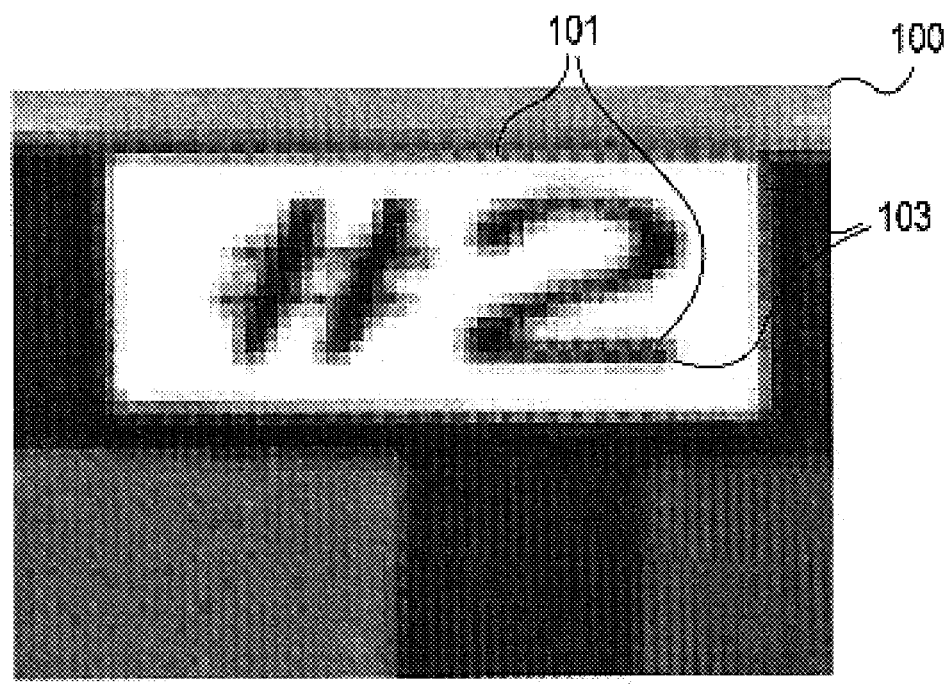
FIG. 1 depicts an exemplary image in which edge enhancements are performed late in an image processing workflow in accordance with prior art.
Figure 6G:
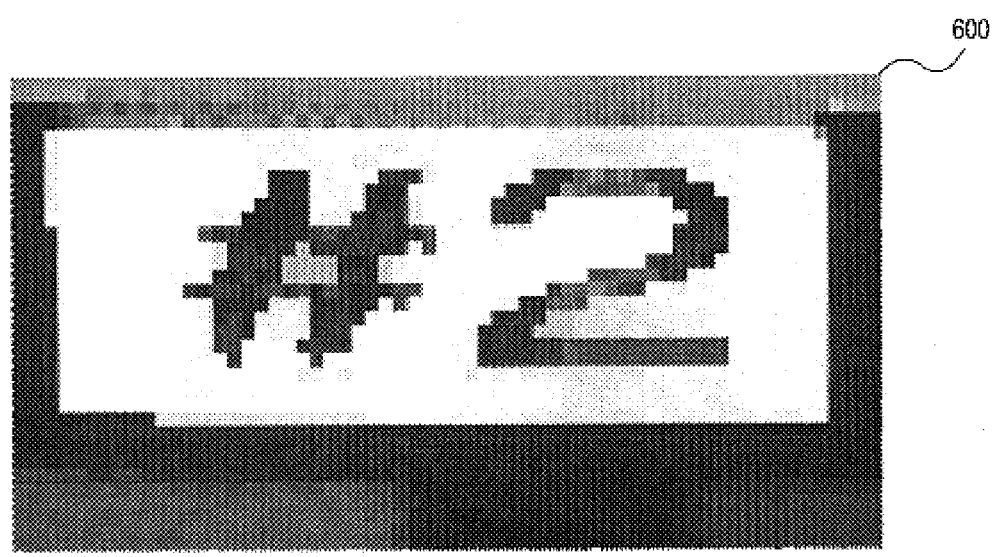
FIG. 6G depicts an exemplary image in which edge enhancments are provided as part of a demosaicing process.

For one embodiment, FIG. 6D and FIG. 6A or 6B may be blended multiplicatively to obtain the final image. FIG. 6G depicts an exemplary final output image in which edge enhancement was provided during a demosaicing process. By way of contrast to FIG. 1 in which edge enhancement is performed at the end of an image processing workflow, FIG. 6G shows significant improvement in color fidelity and edge sharpness. This is a result of performing edge enhancement as part of the demosaicing process.

Figure 7:
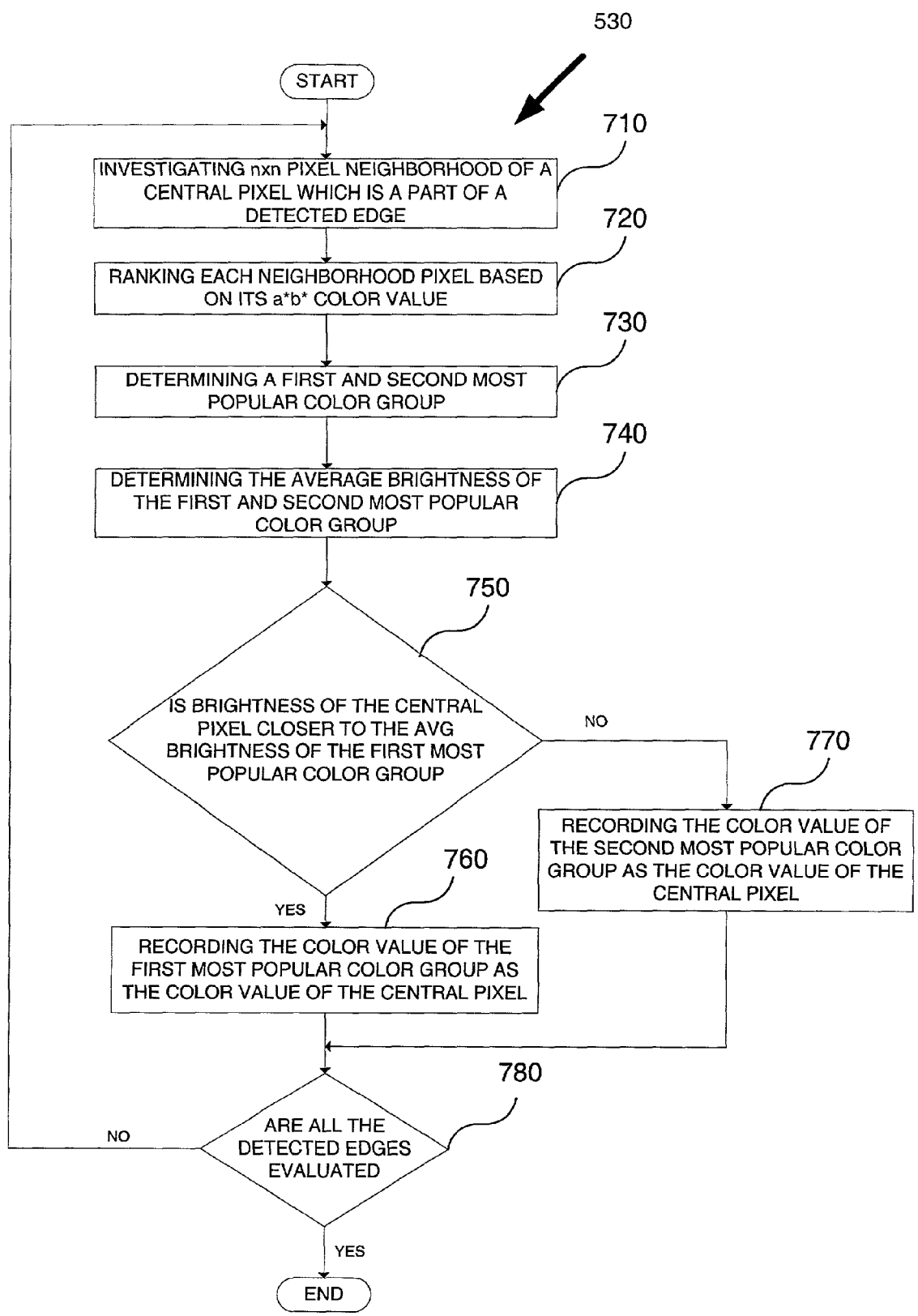
FIG. 7 depicts a flow chart illustrating an operation for a creating mask image from a fringe corrected image according to one embodiment.

FIG. 7 depicts a flow chart illustrating the detailed operation 530 of FIG. 5 to create a mask image by performing edge detection/enhancement. The operation 530 uses the knowledge of the edge location to sharpen the edges of an image in a non-linear way to produce contrast enhancement. For purposes of explanation, operation 530 begins at operation 710.

At operation 710, an N×N pixel neighborhood of a central pixel, which is part of a detected edge, is investigated. To determine the central pixel, a threshold criteria is applied. For example, a threshold criteria is applied to each pixel to determine if it is involved in a significant brightness change compared to its neighbors. Exemplary values for the threshold range from 20-35 units based on an 8-bit monochrome image scale (after the gray image has been created). Thus, once the central pixel is determined to have passed the threshold criteria, the operation investigates the N×N pixel neighborhood.

Figure 8A:
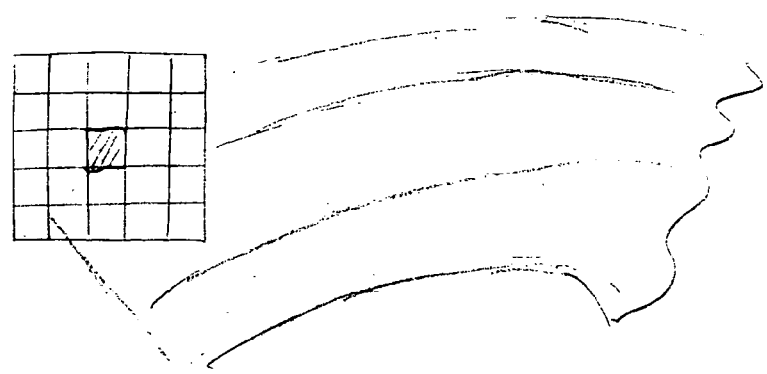
FIG. 8A depicts an exemplary a 5×5 pixel pattern with the central pixel being a part of the edge of an image.

The central pixel (each of the pixels that are determined as a part of the edges) is examined in terms of a localized matrix or cell of pixels that surround the pixel in question in a square array whose size is N pixels wide by N pixels high. Exemplary values of N can be odd numbers, such as 3, 5, 7 ... to N. However, a 5×5 pixel is preferred because it calculates in all the standard compass directions without overwhelming the image processing device's performance. FIG. 8A illustrates schematically a 5×5 pixel with the central pixel being a part of the edge of an image.

At operation 720, each of the twenty-four pixels in the neighborhood of the central pixel is ranked based on its brightness and perceptual color values. To rank each pixel, L*a*b* values are used. The L*a*b* values can be converted from RGB values mathematically.

Figure 8B:
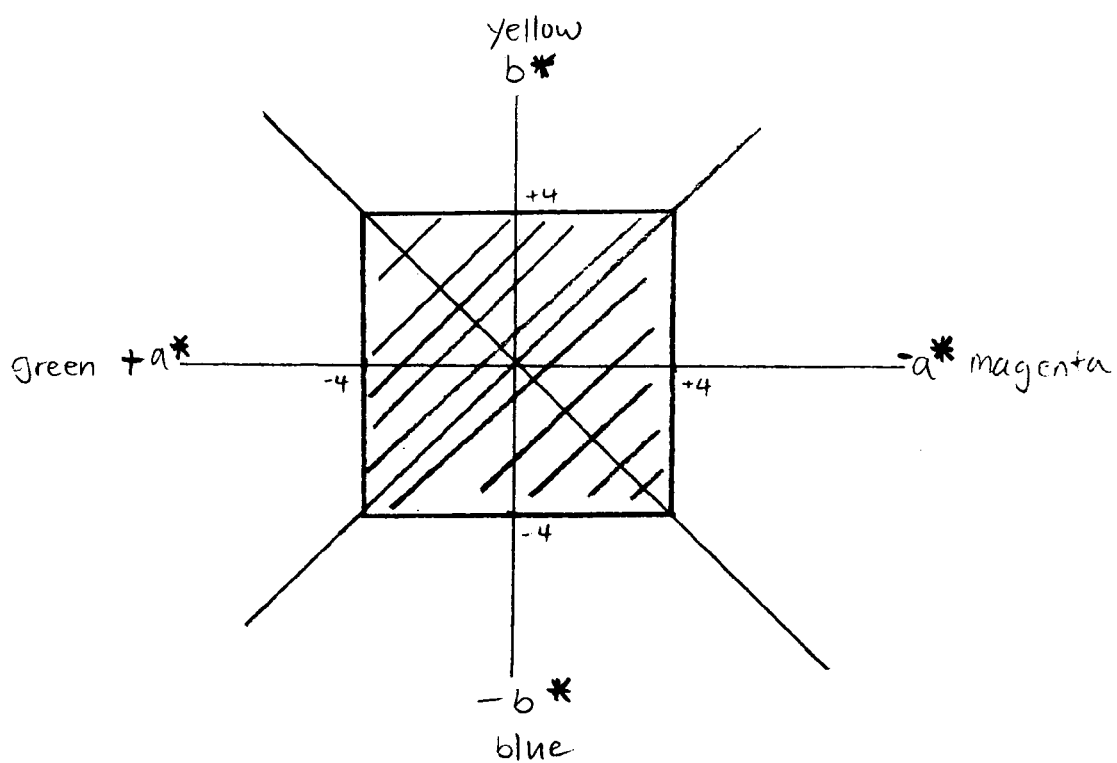
FIG. 8B depicts an exemplary L*a*b* color space chart.

FIG. 8B shows an L*a*b* color space chart divided into multiple bins to classify the color values for each pixel. For one embodiment, the chart is divided into eight bin spaces, but the chart can be divided more than eight bins for greater accuracy. The a* axis runs from green (+a*) to magenta (−a*), and the b* axis runs from yellow (+b*) to blue (−b*).

The chart is further divided into two regions—a first region, which is anywhere in between +4 units and −4 units (based on 8-bit storage values for a* and b*) on either the a* or b* axis (shaded region in FIG. 8A), and a second region that is anywhere outside of the first region. The color values of the first region are neutral and any pixel that falls within the first region are grouped and handled separately than any pixel that falls within the second region. The pixels whose chromaticity (color amount) fall within the radius of + or −4 units in the a* and b* axis are basically neutral colors and are excluded from further processing in determining the chromatic content of the neighborhood around the central pixel.

At operation 730, as for the pixels that fall within in the second region, each of the twenty-four pixels is determined to be in first and second most popular color groups. This determination is based within the eight bin spaces according to its a*,b* value.

At operation 740, the average brightness of each of first and second color groups is determined. At operation 750, a test is applied to compare the central pixel brightness, which passed the threshold criteria, against the first and second popular color groups. The process checks to see if the central pixel's brightness is closer to the first most popular color group.

At operation 760, if the central pixel's brightness is closer to the first most popular color group, then the color values for the first most popular color group are stored in the RGB values of central pixel in question.

At operation 770, if the central pixel's brightness is not closer to the first most popular color group's average brightness (i.e., the central pixel's brightness is closer to the second most popular color group's average brightness), then that second most popular color group's color values are stored into the RGB value for the central pixel. However, the brightness of the central pixel is kept with its original L* value.

At operation 780, the operations 710 to 770 are repeated until all the detected edges are processed. Thus, edge detection and enhancement are provided as part of the demosaicing process.

For any neighborhood pixel that falls within the first region, it is grouped separately and handled as though they are their own separate groups. For any other pixel in the image that is not involved in edges, the original first order demosaiced RGB values are used.

The final image of the above operations in FIGS. 5 and 7 can be illustrated by image 600 of FIG. 6G in which edge enhancement are provided as part of a demosaicing process. By creating a mask image in the above manner, the final image can be more chromatically accurate and spatially correct because edge detection and enhancement are provided as part of the demosaicing process Thus, a method and apparatus to provide edge enhancement during a demosaicing process have been described. In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather than a restrictive sense.

What is claimed is:

1. An image processing method comprising:
capturing a raw image; and
providing edge enhancements to increase edge detail of the captured raw image as part of a demosaicing process using a brightness map of the captured raw image, wherein the brightness map comprises luminance values extracted from the captured raw image, and the edge enhancement includes setting a color value of an edge pixel of a mask image to a color value of one of a plurality of neighboring pixel groups in a demosaiced raw image, the one neighboring pixel group having an average brightness value closest to a brightness value of the edge pixel.

2. The method of claim 1, further comprising:
performing post demosaicing processing on the captured raw image; and
outputting the processed image.

3. The method of claim 1, wherein the demosaicing process further includes:
detecting edges of the captured raw image using the brightness map;
creating the mask image from the edge detected brightness map; and
performing unsharp edge enhancement on the masked image.

4. The method of claim 3, wherein the demosaicing process further includes:
blending multiplicatively the unsharp edge enhanced image with the demosaiced raw image.

5. An apparatus comprising:
an image capturing device to capture a raw image; and
a processor to provide edge enhancements to increase edge detail of the captured raw image as part of a demosaicing process using a brightness map of the captured raw image, wherein the brightness map comprises luminance values extracted from the captured raw image and the edge enhancement includes setting a color value of an edge pixel of a mask image to a color value of one of a plurality of neighboring pixel groups in a demosaiced raw image, the one neighboring pixel group having an average brightness value closest to a brightness value of the edge pixel.

6. The apparatus of claim 5, wherein the processor is to perform post demosaicing processing on the captured raw image and to output the processed image.

7. The apparatus of claim 5, wherein the processor is to detect edges of the captured raw image using the brightness map, to create the mask image from the edge detected brightness map, and to perform unsharp edge enhancement on the masked image.

8. The apparatus of claim 7, wherein the processor is to blend multiplicatively the unsharp edge enhanced image with the demosaiced raw map.

9. A machine-readable medium that provides instructions, which if executed by a processor, cause the processor to perform the operations comprising:
capturing a raw image; and
providing edge enhancements to increase edge detail of the captured raw image as part of a demosaicing process using a brightness map of the captured raw image, wherein the brightness map comprises luminance values extracted from the captured raw image and the edge enhancement includes setting a color value of an edge pixel of a mask image to a color value of one of a plurality of neighboring pixel groups in a demosaiced raw image, the one neighboring pixel group having an average brightness value closest to a brightness value of the edge pixel.

10. The machine-readable medium of claim 9, further providing instructions, which if executed by the processor, cause the processor to perform the operations comprising:
performing post demosaicing processing on the captured raw image; and
outputting the processed image.

11. The machine-readable medium of claim 9, further providing instructions, which if executed by the processor, cause the processor to perform the operations comprising:
detecting edges of the captured raw image using the brightness map;
creating the mask image from the edge detected brightness map; and
performing unsharp edge enhancement on the masked image.

12. The machine-readable medium of claim 11, further providing instructions, which if executed by the processor, cause the processor to perform the operations comprising:
blending multiplicatively the unsharp edge enhanced image with the demosaiced raw map.

13. An image processing device comprising:
an image capturing unit to capture a raw image;
a memory device to store the captured raw image;
an output unit coupled to the memory device; and
a processor to provide edge enhancements to increase edge detail of the captured raw image in the memory device as part of a demosaicing process using a brightness map of the captured raw image, wherein the brightness map comprises luminance values extracted from the captured raw image, the brightness map is approximated from a bi-linear interpolation of the raw image, and the edge enhancement includes setting a color value of an edge pixel of a mask image to a color value of one of a plurality of neighboring pixel groups in a demosaiced raw image the one neighboring pixel group having an average brightness value closest to a brightness value of the edge pixel and to cause the enhanced image to be output is to the output unit.

14. The image processing device of claim 13, wherein the image capturing unit includes a charge-couple device (CCD) array, phototransistors, or photodiodes.

15. The image processing device of claim 13, wherein the output unit is a display device.

16. The image processing device of claim 15, wherein the processor is to perform post demosaicing processing on the captured raw image and to cause the image to be output to the display device.

17. The image processing device of claim 16, wherein the post demosaicing processing is a white balancing processing or a chromatic improvement processing.

18. The method of claim 1, further comprising:
grouping a neighborhood of pixels around the edge pixel to create the plurality of neighboring pixels groups, wherein the grouping is based on the colors values of each of the neighborhood of pixels; and
computing an average brightness value for each of the plurality of neighboring pixels groups.

19. The method of claim 18, further comprising:
excluding from the plurality of neighboring pixel groups, pixels of the neighborhood of pixels that have neutral colors.

20. The method of claim 18, further comprising:
comparing the brightness value of the edge pixel with the average brightness value of each of the neighboring pixel groups.

21. The apparatus of claim 5, wherein the processor is to group a neighborhood of pixels around the edge pixel to create the plurality of neighboring pixels groups, wherein the grouping is based on the colors values of each of the neighborhood of pixels and to compute an average brightness value for each of the plurality of neighboring pixels groups.

22. The apparatus of claim 21, wherein the processor is to exclude from the plurality of neighboring pixel groups, pixels of the neighborhood of pixels that have neutral colors.

23. The apparatus of claim 21, wherein the processor is to compare the brightness value of the edge pixel with the average brightness value of each of the neighboring pixel groups.

24. The machine-readable medium of claim 9, further providing instructions, which if executed by the processor, cause the processor to perform the operations comprising:
grouping a neighborhood of pixels around the edge pixel to create the plurality of neighboring pixels groups, wherein the grouping is based on the colors values of each of the neighborhood of pixels; and
computing an average brightness value for each of the plurality of neighboring pixels groups.

25. The machine-readable medium of claim 24, further providing instructions, which if executed by the processor, cause the processor to perform the operations comprising:
excluding from the plurality of neighboring pixel groups, pixels of the neighborhood of pixels that have neutral colors.

26. The machine-readable medium of claim 24, further providing instructions, which if executed by the processor, cause the processor to perform the operations comprising:
comparing the brightness value of the edge pixel with the average brightness value of each of the neighboring pixel groups.

27. The image processing device of claim 13, wherein the processor is to group a neighborhood of pixels around the edge pixel to create the plurality of neighboring pixels groups, wherein the grouping is based on the colors values of each of the neighborhood of pixels and to compute an average brightness value for each of the plurality of neighboring pixels groups.

28. The image processing device of claim 13, wherein the processor is to exclude from the plurality of neighboring pixel groups, pixels of the neighborhood of pixels that have neutral colors.

29. The image processing device of claim 13, wherein the processor is to compare the brightness value of the edge pixel with the average brightness value of each of the neighboring pixel groups.

* * * * *